(12) United States Patent
MacInnis et al.

(10) Patent No.: US 7,580,457 B2
(45) Date of Patent: Aug. 25, 2009

(54) UNIFIED SYSTEM FOR PROGRESSIVE AND INTERLACED VIDEO TRANSMISSION

(75) Inventors: Alexander G. MacInnis, Los Altos, CA (US); Sheng Zhong, Fremont, CA (US)

(73) Assignee: Broadcom Corporation, Irvine, CA (US)

( * ) Notice: Subject to any disclaimer, the term of this patent is extended or adjusted under 35 U.S.C. 154(b) by 760 days.

(21) Appl. No.: 10/866,277

(22) Filed: Jun. 10, 2004

(65) Prior Publication Data
US 2005/0088573 A1 Apr. 28, 2005

Related U.S. Application Data

(60) Provisional application No. 60/513,830, filed on Oct. 23, 2003.

(51) Int. Cl.
*H04N 7/12* (2006.01)
(52) U.S. Cl. ............... 375/240.01; 375/240.21
(58) Field of Classification Search ............ 375/240.01, 375/240.21; 348/434.1, 446, 448, 584; 382/244
See application file for complete search history.

(56) References Cited

U.S. PATENT DOCUMENTS 5,438,368 A * 8/1995 Hutter ............... 348/434.1
5,903,676 A * 5/1999 Wu et al. ............. 382/244
6,327,306 B1 * 12/2001 Sugiyama ........... 375/240.21
6,392,712 B1 * 5/2002 Gryskiewicz et al. ..... 348/584

OTHER PUBLICATIONS

European Search Report corresponding to European Patent Application Serial No. 04025311.4-1241, completed Feb. 28, 2008, 2 sheets.
Lim, Jae S., "A Proposal for an HDTV/ATV Standard with Multiple Transmission Formats," SMPTE Journal, SMPTE Inc., vol. 102, No. 8, Aug. 1, 1993, pp. 699-703.
Westerkamp et al., "The Benefits of a Progressive Scan Based HDTV System," Proceedings of the International Conference on Consumer Electronics, Jun. 8-10, 1998, 3 pages.
Database Inspec [Online] The Institution of Electrical Engineers, Stevenage, GB; 1990, LUPLOW, "Spectrum-Compatible High-Definition Television," C:\EPOPROGS\SEA\.\..\epodata\sea\eplog\internal.log.

* cited by examiner

*Primary Examiner*—Gims S Philippe
(74) *Attorney, Agent, or Firm*—McAndrews, Held & Malloy Ltd.

(57) ABSTRACT

A system and method that support both progressive and interlaced format video transmission and display. The system utilizes de-interlacing techniques to convert input interlaced format video to progressive format video, and compress and vertically scale the progressive format video to communicate videos more efficiently in a progressive format. The system also supports interlaced and progressive displays, where after decompressing and vertically resealing the communicated compressed progressive format video, the video may be converted to interlaced format if the display supports interlaced format video. The system is capable of dynamically switching between the progressive and the interlaced format modes.

16 Claims, 2 Drawing Sheets

UNIFIED SYSTEM FOR PROGRESSIVE AND INTERLACED VIDEO TRANSMISSION

RELATED APPLICATIONS

This patent application makes reference to, claims priority to and claims benefit from U.S. Provisional Patent Application Ser. No. 60/513,830, entitled "Unified System for Progressive and Interlaced Video Transmission," filed on Oct. 23, 2003.

The complete subject matter of the above-referenced United States Patent Application is hereby incorporated herein by reference, in its entirety. In addition, this application makes reference to U.S. patent application Ser. No. 10/293,858, entitled "System And Method For Vertical Compression and De-Compression of Progressive Video Data," publication date Jun. 5, 2003, and U.S. patent application Ser. No. 10/293,730, entitled "System And Method For Aligned Compression of Interlaced Video," publication date May 22, 2003, the complete subject matter of each of which is hereby incorporated herein by reference, in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

In the field of video compression, communication, decompression, and display, there have been for many years problems associated with supporting both interlaced content and interlaced displays along with progressive content and progressive displays. There are serious technical issues with merging progressive systems and interlaced systems, and as a result there are separate, largely incompatible systems in use. There are strong motivations to design a common system, to have content-compatible systems for all types of displays, to support the coming generation of progressive display Televisions (TVs), and to support the most efficient compression of video in new compression standards.

Digital compression schemes that are optimized for interlaced video content are more complex than those designed for progressive video, and the degree of added complexity associated with interlaced coding increases as other aspects of the compression schemes also become more complex, in the ongoing effort to provide more efficient compression. As a result, the use of interlaced coding tools is becoming increasingly less attractive.

Conventional TVs, and almost all TVs in use today, use the interlaced scanning method that was introduced many decades ago. Virtually all TV broadcasts and recorded video content intended for TV display are in interlaced format. On the other hand, almost all personal computers (PCs) use progressive scanning displays, and compressed video available over the Internet and compressed video for PCs are in progressive format as well. Hence, there is a problem now in that TVs use one format, while PCs use another.

In the realm of high definition televisions (HDTV), there was a conflict whether interlaced format or progressive format should be used for broadcast, and the result is that both formats are in use, with the requirement that HDTVs be able to convert between them to support both types of content and, in some cases, both types of display.

A set of HDTV video formats, as defined by Advanced Television Standards Committee (ATSC), includes a progressive format at 1280×720/60p (60 frames per second (fps) progressive) and an interlaced format 1920×1080/30i (30 fps interlaced). These two formats are commonly used, and there are converters that convert back and forth between them. However, the standard for the progressive format of 1280×720 only supports frames or images with 1280 pixels per line or less, which requires the interlaced format of 1920×1080/30i to be horizontally scaled down to 1280 or less, which may not be desirable. This standard also requires using the interlaced coding tools, which increase the complexity of a system.

The problem many systems are faced with is the complexity of digitally compressing interlaced content. Fields of interlaced frames are spatially and temporally separated. One approach to deal with this problem is to treat interlaced video frames as if each field were a progressive video frame. There are several problems with this approach. Each field contains only half the vertical resolution of the original frame, so treating a field as if it were a frame causes a loss of resolution and aliasing of vertical detail. Also, the even and odd fields represent different vertical sampling positions, making motion-compensated compression more difficult.

Another approach that has been used is to take 30 fps interlaced video, which is 60 fields per second, and convert it to 30 fps progressive by some means. One problem in such an approach is that temporal detail is being thrown away, because each field of interlaced video is sampled at a unique time, with 60 samples per second in this example, and the result of this conversion has only 30 samples per second. Methods that convert interlaced video into progressive video format, known as de-interlacers, are well known in the art. A representative published paper that gives an overview of de-interlacing methods is: "Deinterlacing-an overview," De Haan, G.; Bellers, E. B.; Proceedings of the EEE, Volume: 86 Issue: 9, September 1998 Page(s): 1839-1857.

Other compression techniques have been used by standards such as the MPEG-2 standard where interlaced video is directly compressed. One method uses frame pictures where two interlaced fields are interleaved directly and treated as a frame. Another method uses field pictures where each interlaced field is treated as a picture. Yet another method uses field coded frame pictures where frame pictures resulting from interleaving two interlaced fields are compressed using static or dynamic field and frame coding methods, including inter-frame prediction using frame or field prediction and field or frame transform coding of the residual signal.

The MPEG AVC (Audio-Visual Coding) standard (a.k.a. ITU H.264) is another example of a standard that uses a compression method that includes explicit coding tools for interlaced content. In the example of MPEG AVC, the combination of explicit interlaced coding with an adaptive loop filter, direct mode motion compensation and other modern compression techniques results in substantially increased complexity of both encoders and decoders.

In order to make widespread use of new compression formats, it is highly desirable that the vast range of content meant for TVs be supported, and that TV displays also be supported, in an efficient and cost effective manner, without adding undue complexity to the compression and decompression systems.

Further limitations and disadvantages of conventional and traditional approaches will become apparent to one of ordinary skill in the art through comparison of such systems with the present invention.

BRIEF SUMMARY OF THE INVENTION

Aspects of the present invention may be seen in a system that transmits and displays interlaced and progressive format input video, wherein the transmission is done in progressive format, and the displayed video has no perceptible loss of vertical and temporal resolution. The system may comprise an encoding end comprising at least one first element that converts an input video in interlaced format to video in progressive format, and at least one second element that vertically scales down the video in progressive format. The at least one first element may utilize a de-interlacing technique. In an embodiment of the present invention, the at least one first element and the at least one second element may comprise separate physical devices. The at least one second element may utilize the Kell factor in vertically scaling down the video in progressive format.

In an embodiment of the present invention, the encoding end may comprise at least one third element that compresses the video in progressive format utilizing a compression technique.

The system may also comprise a decoding end, wherein the encoding end communicates the compressed video in progressive format to the decoding end. The decoding end may comprise at least one fourth element that decompresses the communicated compressed video in progressive format.

The system may also comprise a display that receives an output from the decoding end. The decompressed video in progressive format may be displayed on the display. In an embodiment of the present invention, the decoding end may comprise at least one fifth element that converts the decompressed video in progressive format to video in interlaced format for display.

Aspects of the present invention also provide a method for transmitting and displaying interlaced and progressive format input video, wherein the transmitting is done in progressive format, and the displayed video has no perceptible loss of at least one of vertical and temporal resolution. The method may comprise converting input video to progressive format, if input video is in interlaced format, and scaling down the video in progressive format vertically. The converting may utilize a de-interlacing technique. The method may also comprise decompressing the compressed video in progressive format.

In an embodiment of the present invention, the method may additionally comprise displaying the decompressed video in progressive format on a display that supports progressive format display. In another embodiment of the present invention, the method may comprise converting the decompressed video from progressive format to interlaced format, and displaying the video in interlaced format on a display.

These and other features and advantages of the present invention may be appreciated from a review of the following detailed description of the present invention, along with the accompanying figures in which like reference numerals refer to like parts throughout.

DETAILED DESCRIPTION OF THE INVENTION

Aspects of the present invention relate to a complete end-to-end compression, transmission, and decompression system, which transmits content in progressive format, even when the content entering the compression system is in interlaced format, and even when the display device following decompression supports only interlaced video.

Figure 1:
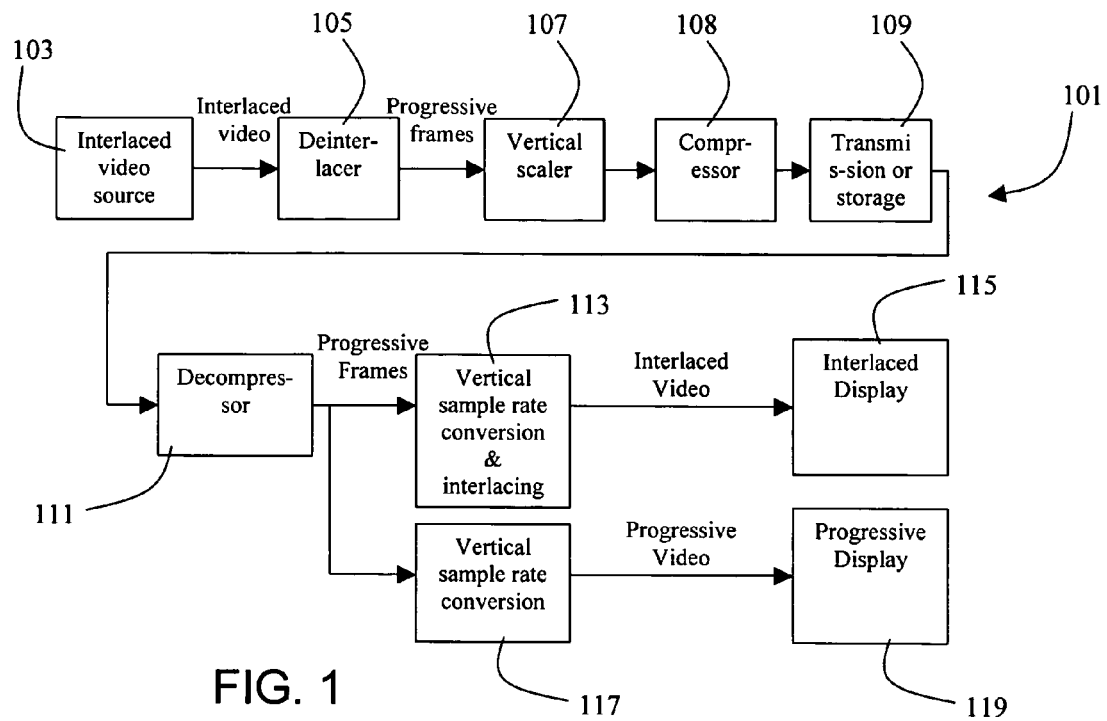
FIG. 1 illustrates an exemplary system for transmitting and displaying interlaced and progressive content, in accordance with an embodiment of the present invention.

FIG. 1 illustrates an exemplary system 101 for transmitting and displaying interlaced and progressive content, in accordance with an embodiment of the present invention. In an embodiment of the present invention, video in interlaced format may be the input 103 to the system. The interlaced content may then be converted to progressive format. The resulting progressive format video may have a frame rate equal to either the field rate or the frame rate of the interlaced content. In an embodiment of the present invention, utilizing a progressive frame rate equal to the interlaced field rate may yield results with higher video quality. In another embodiment of the present invention, utilizing a progressive frame rate equal to the interlaced frame rate (i.e., half the field rate) may yield a lower compressed bit rate at the expense of reduced video quality. Such an embodiment may be utilized where there is little inter-field motion in the interlaced content or the lower bit rate justifies a possible reduction in the video quality.

The conversion of interlaced format to progressive format may be accomplished using any of a wide variety of de-interlacing methods 105. In an embodiment of the present invention, a method of de-interlacing such as motion-adaptive de-interlacing may be used. In another embodiment of the present invention, vertical phase shifting of interlaced fields may be used to convert from interlaced format to progressive format. Examples of de-interlacing methods may be found in U.S. patent application Ser. No. 10/293,730, entitled "System And Method For Aligned Compression of Interlaced Video," publication date May 22, 2003, the complete subject matter of which is hereby incorporated herein by reference, in its entirety.

In an embodiment of the present invention, the de-interlacing may be done independently from the encoder. In such an embodiment, any appropriate de-interlacing tool may be utilized.

In an embodiment of the present invention, the uncompressed progressive content, which may result from the conversion, may be scaled to a size consistent with the desired resolution for the display or it may be compressed 108. In an embodiment of the present invention, when interlaced content is converted to progressive format with a frame rate equal to the interlaced field rate, the progressive format may be vertically scaled down 107 such that there is no perceptual loss of resolution when the final decompressed content is converted back to interlaced format.

Figure 2:
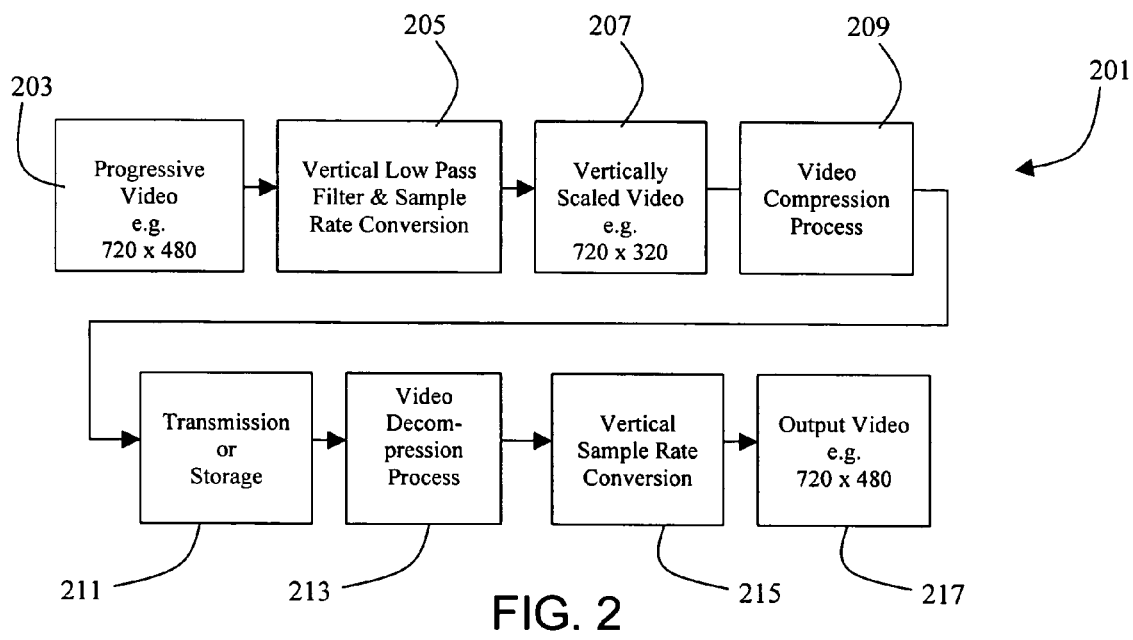
FIG. 2 illustrates an exemplary process of compression, transmission and decompression of progressive video including vertical scaling, in accordance with an embodiment of the present invention.

FIG. 2 illustrates an exemplary process 201 of compression, transmission and decompression of progressive video including vertical scaling, in accordance with an embodiment of the present invention. In an embodiment of the present invention, the input may be a progressive video 203 at, for example, 720×480 pixels per frame. The progressive video may then be vertically scaled utilizing, for example, a vertical low pass filtering and sample rate conversion step 205. The result may be a vertically scaled video 207 at a size such as, for example, 720×320 pixels per frame (i.e., a vertical scale down by a factor of two thirds). In an embodiment of the present invention, the video may be compressed further using any of a plurality of compression methods well known in the field of video compression 209. The compressed progressive video may then be transmitted or stored using any one of many known storage methods and devices at step 211. The video decompression process 213 may then be used to restore the compressed progressive video to its size before compression (i.e., 720×320 pixels per frame). Vertical sample rate conversion 215 may then be utilized to restore the vertically scaled down progressive video to its original size. As a result, the output 217 may be the progressive video at 720×480 pixels per frame, the same as the input 203.

The progressive format content may be scaled down vertically with no perceptual loss of resolution due to the "Kell factor." The human perception of vertical resolution in interlaced video is limited to approximately 0.6 to 0.7 of the total number of samples (scan lines) measured in the vertical direction. As a result, for example, 480 line interlaced video frames, approximately 0.6*480=288 to 0.7*480=330 lines in de-interlaced progressive frames may contain adequate information to convey a perceptually equivalent image. In an embodiment of the present invention, the input video may be in progressive format and intended for display on a display device supporting interlaced format video. In another embodiment of the present invention, the input video may be in progressive format intended for display on a display device supporting progressive format video. In yet another embodiment of the present invention, the input video may be in interlaced format. In embodiments of the present invention, vertically scaling down an image by the "Kell factor" before transmission, and vertically scaling up the image before display yields an image perceptually equivalent to an image that was not vertically scaled, in that to the human eye no difference may be seen between the two images. Consequentially, video in progressive format with 288 to 330 scan lines may be adequate to support 480 line interlaced displays, such as conventional TVs in North America. Similar conversions may apply to other interlaced systems such as, for example, systems that use 576 lines as used in many other parts of the world, or to high definition video systems such as, for example, systems that use 1080 lines per frame. Therefore, the unified progressive-interlaced system may transmit, for example, 288 lines per frame of progressive content at 60 fps and convey sufficient information to support full quality display on an interlaced TV with 480 lines and 60 fields per second, with no perceptual loss of either spatial or temporal resolution, while transmitting the progressive format video at a relatively low bit rate.

In an embodiment of the present invention, referring to FIG. 1, progressive content may be compressed using a video compressor 108 and transmitted using transmission or storage 109 at a frame rate that is adequate to convey temporal details. In an embodiment of the present invention, the frame rate may be, for example, 25 fps in the case of 50 Hz interlaced content (25 Hz frame rate), which may yield little inter-field motion and low bit rates. In another embodiment of the present invention, the frame rate may be 60 fps in the case of 60 Hz interlaced content, which may yield the best resulting video quality. In such an embodiment, the additional compressed bit rate, which is transmitted to support 60 fps as compared to 30 fps for the same content, is generally very small in cases where there may not be much inter-field motion, since intervening frames may be predicted from previous frames. In an embodiment of the present invention, using multi-frame prediction techniques in the compression step may be utilized in compressing 60 fps content efficiently. Considering that the human visual system is insensitive to spatial detail combined with fast temporal motion, some blurring of the image and subsequent further compression may be acceptable in parts of the video where 60 fps may be required for temporal resolution. The encoder may blur the image in regions where there may be fast motion; such blurring may result in a reduced compressed bit rate. In other embodiments of the present invention, other compression methods may be considered such as, for example, motion compensated prediction.

The progressive content may then be vertically scaled using a vertical scaler 107 and compressed with a video compressor 108, transmitted using a method or device of transmission or storage 109, received, and decompressed utilizing a decompressor 111. In an embodiment of the present invention, the decompressed progressive content may then be scaled and converted to interlaced format 113, when interlaced output is required for interlaced displays 115. In such an embodiment, converting to interlaced format may require scaling, i.e., changing the size of the video to match the display, and it may also require vertical phase shift adjustment to match the content to the interlaced display. For example, a video may have been compressed and transmitted with a picture size of 704×330 at 60fps, progressive. In one embodiment of the present invention, video with 330 lines per frame may be decompressed and then scaled down to 240 lines per field of interlaced video, and at the same time the scaling is done, the vertical phase (or position) of the video may be shifted up or down by one-half a display line height. In another embodiment of the present invention, the 330 lines per frame may be scaled up to 480 lines per frame, for example, and either the even or odd lines of the result may be sent to an interlaced display, depending on the instantaneous (alternating) field polarity of the display.

In another embodiment of the present invention, the decompressed progressive content may be scaled and displayed as progressive content 117 displaying on progressive displays 119. In an embodiment of the present invention, the system 101 may have an interlaced display 115. In another embodiment of the present invention, the system 101 may have a progressive display 119. In yet another embodiment of the present invention, the system 101 may have both an interlaced display 115 and a progressive display 119.

In an embodiment of the present invention, horizontal scaling of the video after, before or simultaneously with vertical scaling 107 and before compression 108 may be performed. Additionally, horizontal scaling of the video after decompression 111 and before, after or simultaneously with vertical scaling 113 may also be performed. For example, NTSC (National Television System Committee) video, which is interlaced, at 29.97 fps, 704 samples per line and 480 lines per frame, may be de-interlaced to form a progressive video at 59.94 fps, 704 samples per line and 480 lines per frame. The progressive video may then be vertically compressed by a factor of 0.6, for example, resulting in a progressive video at 59.94 fps, 704 samples per line and 288 lines per frame. The video may also be scaled horizontally to 544 samples per line, for example. The vertical and horizontal scaling may be performed in either order, or simultaneously. The resulting 544× 288 59.94 fps progressive video may be compressed, transmitted, received, and decompressed. Following decompression the 544×288 59.94 fps progressive video may be converted to NTSC-compatible video, i.e. interlaced, 29.97 fps, 704 samples per line and 480 lines per frame, or 59.94 fields per second, 704 samples per line and 240 lines per field. In cases where the receiver has a progressive display, the decompressed video may be scaled to a size appropriate for display on the progressive display device, without conversion to interlaced format.

Figure 3:
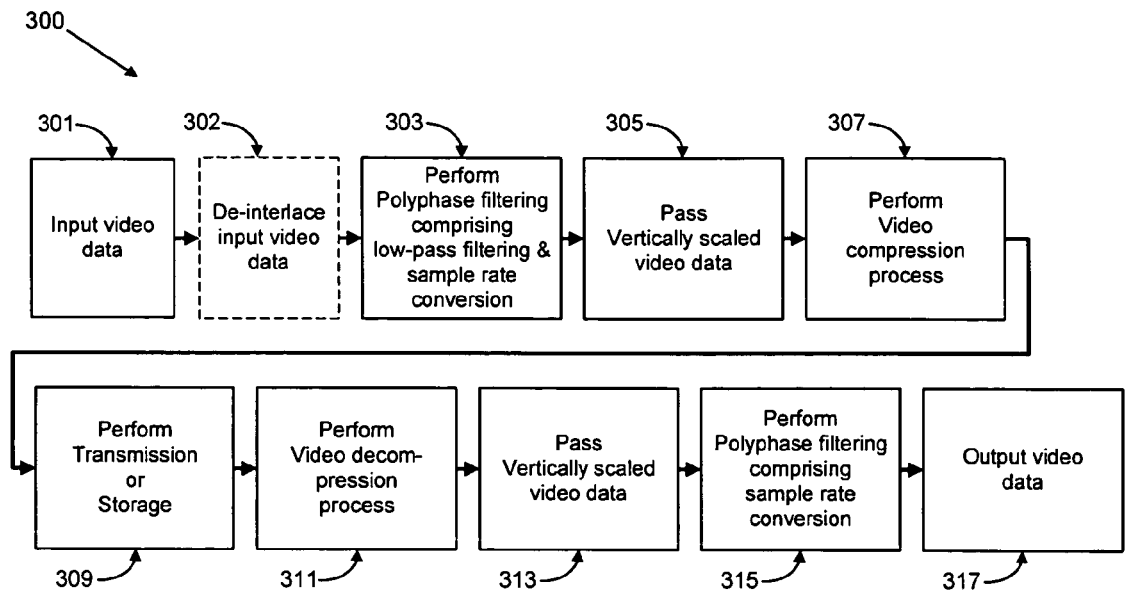
FIG. 3 illustrates an exemplary flowchart of a method for vertical compression and de-compression of video data using poly-phase filtering to perform low-pass filtering and sample rate conversion in accordance with an embodiment of the present invention.

FIG. 3 illustrates an exemplary method 300 for vertical compression and de-compression of video data using poly-phase filtering to perform low-pass filtering and sample rate conversion in accordance with an embodiment of the present invention.

Figure 4:
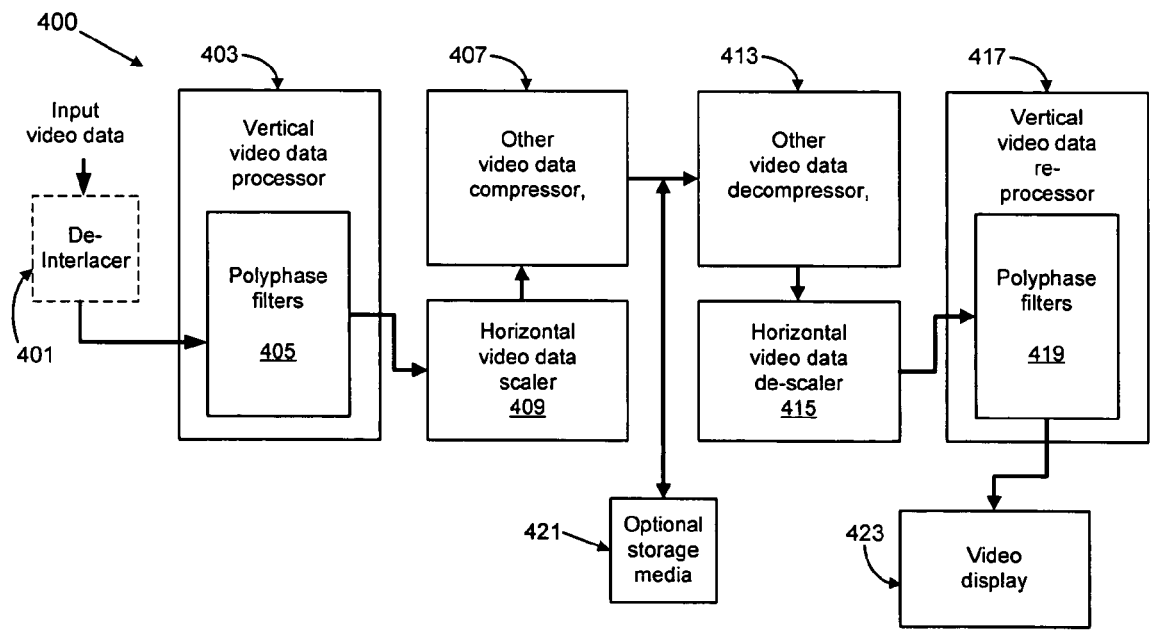
FIG. 4 illustrates an exemplary block diagram of an apparatus for compressing and de-compressing video data comprising poly-phase filters in accordance with an embodiment of the present invention.

FIG. 4 illustrates an exemplary block diagram of an apparatus 400 for compressing and de-compressing video data comprising poly-phase filters in accordance with an embodiment of the present invention.

Referring to FIG. 3 and FIG. 4, in one embodiment of the present invention, the method 300 may take an input stream of video content in step 301. In an embodiment of the present invention, the input stream of video may be in interlaced format at step 301. In such an embodiment, the input video at step 301 may be de-interlaced at step 302 using a de-interlacer such as, for example, de-interlacer 401. In another embodiment of the present invention, the input stream of video may be in progressive format at step 301. In such an embodiment, the input video at step 301 may bypass the de-interlacing at step 302 and go straight to step 303. In embodiments of the present invention, the video being input into step 303 is in progressive format having a picture size of, for example, 720×480 pixels per frame. The video content may then be low-pass filtered and sample-rate converted in step 303, to reduce the vertical picture height to, for example, 320 lines. The low-pass filtering and sample rate conversion may be accomplished by means of a vertical video data processor such as, for example, the vertical video data processor 403 comprising poly-phase filters 405. Examples of poly-phase filters may be found in U.S. patent application publication Ser. No. 10/293,858, entitled "System And Method For Vertical Compression and De-Compression of Progressive Video Data," publication date Jun. 5, 2003, the complete subject matter of which is hereby incorporated herein by reference, in its entirety. In the example, the resulting vertically scaled video now has a frame size of 720×320 pixels per frame. The vertically scaled video may be passed on for video compression in step 307, which may further reduce the overall picture size and reduce the bit rate for transmission or storage. The compression process may be achieved by means of a horizontal video data scaler such as, for example, the horizontal video data scaler 409 and a video data compressor such as, for example, the video data compressor 407 implementing a standard compression technique such as, for example, MPEG-1, MPEG-2, MPEG-4, or MPEG-AVC. The video may then be transmitted or stored in step 309 using, for example, storage media 421.

When the video is received (i.e. either directly or from storage, as the case may be), the video may be de-compressed in step 311 using a de-compression process that corresponds to the compression process performed in step 307. The de-compression process may be achieved by means of a video data de-compressor such as, for example, the video data de-compressor 413 implementing a standard de-compression technique such as, for example, MPEG-1, MPEG-2, MPEG-4, or MPEG-AVC. In an embodiment of the present invention, the de-compression process may be further achieved by an additional horizontal video data de-scaler such as, for example, the horizontal video data de-scaler 415. In the example, the resulting video now has a pixel size of 720×320 pixels per frame, corresponding to the vertically scaled video data in step 305. The vertically scaled video may then be passed in step 313 to vertical video re-processor such as, for example, the vertical video data re-processor 417 comprising poly-phase filters 415, which may result in sample rate conversion of the video at step 315. In the example, the resulting de-compressed video may be output at 720×480 pixels per frame at step 317 and may then be transmitted to a progressive video display such as, for example, the progressive video display 423. In another embodiment of the present invention, the de-compressed video with a resolution of 720×480 pixels per frame may be converted to interlaced format for display on an interlaced display device. In an embodiment of the present invention, the vertical scaling step may precede the horizontal scaling step. In another embodiment of the present invention, the vertical scaling and the horizontal scaling may be performed simultaneously.

In an embodiment of the present invention, the system may dynamically switch between the progressive and the interlaced format modes such that the input to the system may be in interlaced or progressive format, and the output or display may support interlaced or progressive format. The input may be dynamically converted, based on its format, then input into the system, and at the display, the output of the system may be dynamically converted to a format appropriate for the display device. For example, a video may be sent to a PC, which has a progressive display. A video in progressive format may be sent through the system, in which case, the system need not do any de-interlacing and converting to interlaced format, so the progressive content is simply vertically scaled down, compressed, decompressed, vertically scaled up, and displayed on the progressive display. However, a next video clip may be in interlaced format and sent to the same display. In such a case, the system of the present invention, may dynamically switch to the mode where the interlaced content is de-interlaced (converted to progressive), vertically scaled down, compressed, decompressed, vertically scaled up, and displayed on the progressive display.

In another embodiment of the present invention, the system may have an interlaced display such as, for example, a TV. In such an embodiment, the input video may be in progressive format, in which case, the system need not do any de-interlacing, so the progressive content is vertically scaled down, compressed, decompressed, vertically scaled up, and converted to interlaced format then displayed on the interlaced display. However, a next video clip may be in interlaced format. In such a case, the system of the present invention may dynamically switch to the mode where the interlaced content is de-interlaced (converted to progressive), vertically scaled down, compressed, decompressed, vertically scaled up, converted back to interlaced format, and displayed on the interlaced display. In yet another embodiment of the present invention, as an alternative to scaling up vertically and converting to interlaced format for display, the video may be scaled down vertically and converted to interlaced format for display.

In an embodiment of the present invention, the system may support displaying both progressive and interlaced format video. In such an embodiment, the system may dynamically switch between the two displays, based on the type of display on which the input video may have been intended to be displayed. In another embodiment of the present invention, the system may provide outputs to both progressive and interlaced displays simultaneously.

Embodiments of the present invention may be implemented as a board level product, as a single chip, application specific integrated circuit (ASIC), or with varying portions integrated on a single chip with other portions of the system as separate components. In an embodiment of the present invention, the transmitting side of the system, from the input video to the transmitted output, may be implemented on one or more chips. Similarly, the receiving side of the system, from the received input, which is the signal transmitted by the transmitting side, to the output video to the display device, may be implemented on one or more chips. The degree of integration of the system may primarily be determined by speed and cost considerations. For example, because of the sophisticated nature of modern processors, it is possible to utilize a commercially available processor, which may be implemented external to an ASIC implementation of the present system. Alternatively, if the processor is available as an ASIC core or logic block, then the commercially available processor can be implemented as part of an ASIC device with various functions implemented as firmware.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system that receives and provides for display interlaced and progressive format input video, wherein the transmission is done in progressive format, and the displayed video has no perceptible loss of vertical and temporal resolution, said system further comprising:
   an input end for receiving input video from an encoding end, wherein the encoding end converts the input video in interlaced format to progressive format with at least a first element, vertically scales down the input video in progressive format with at least a second element, and compresses the vertically scaled down input video with at least a third element;
   a decompressor for decompressing the input video;
   a vertical rate converter for sample rate converting the input video; and
   an interlacer for selectively interlacing the input video; and
   wherein progressive video is output if interlacing is not selected.

2. The system according to claim 1 wherein the at least one first element utilizes a de-interlacing technique.

3. The system according to claim 1 wherein the at least one first element and the at least one second element comprise separate physical devices.

4. The system according to claim 1 further comprising a display that receives an output from the system.

5. The system according to claim 4 wherein the decompressed video in progressive format is displayed on the display.

6. The system of claim 1, wherein the the encoding end compresses the vertically scaled down video in progressive format utilizing temporal compression.

7. The system of claim 1, wherein the the encoding end compresses the vertically scaled down video in progressive format utilizing spatial compression.

8. The system of claim 1, wherein the encoding end compresses the vertically scaled down video in progressive format utilizing MPEG-2.

9. The system of claim 1, wherein the encoding end compresses the vertically scaled down video in progressive format utilizing H.264.

10. A system for providing for display video data, said system comprising:
    an integrated circuit comprising:
       an input for receiving an input video that was converted from interlaced format to video in progressive format by a first element, vertically scaled down by at least a second element, and compressed by at least a third element;
       a decompressor for decompressing the input video;
       a vertical rate sample converter for changing the vertical sampling rate of the input video; and
       an interlacer for selectively interlacing the decompressed, sample rate converted, input video; and
       wherein progressive video is output if interlacing is not selected.

11. The system according to claim 10 wherein the first element utilizes a de-interlacing technique.

12. The system according to claim 10 wherein the second element utilizes a Kell factor in vertically scaling down the video in progressive format.

13. The system of claim 10, wherein the third element uses temporal compression.

14. The system of claim 10, wherein the third element uses spatial compression.

15. The system of claim 10, wherein the third element uses MPEG-2 compression.

16. The system of claim 10, wherein the third element uses H.264 compression.

* * * * *